July 4, 1939.  L. C. VAN PATTEN  2,165,019
ROD WEEDER
Filed Dec. 20, 1938  4 Sheets-Sheet 1

LOUIS C. VAN PATTEN
INVENTOR
BY O. W. Lee
ATTORNEY

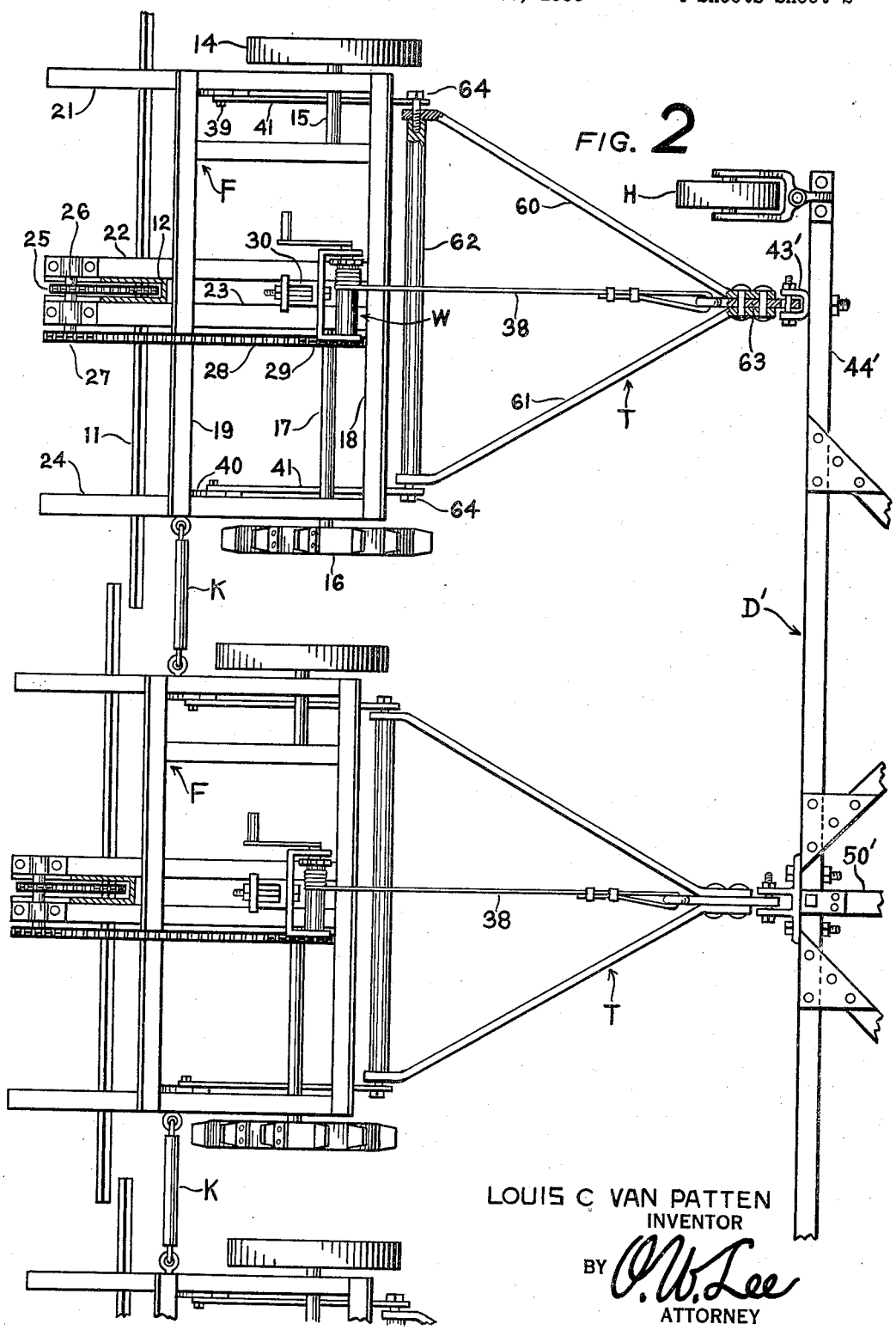

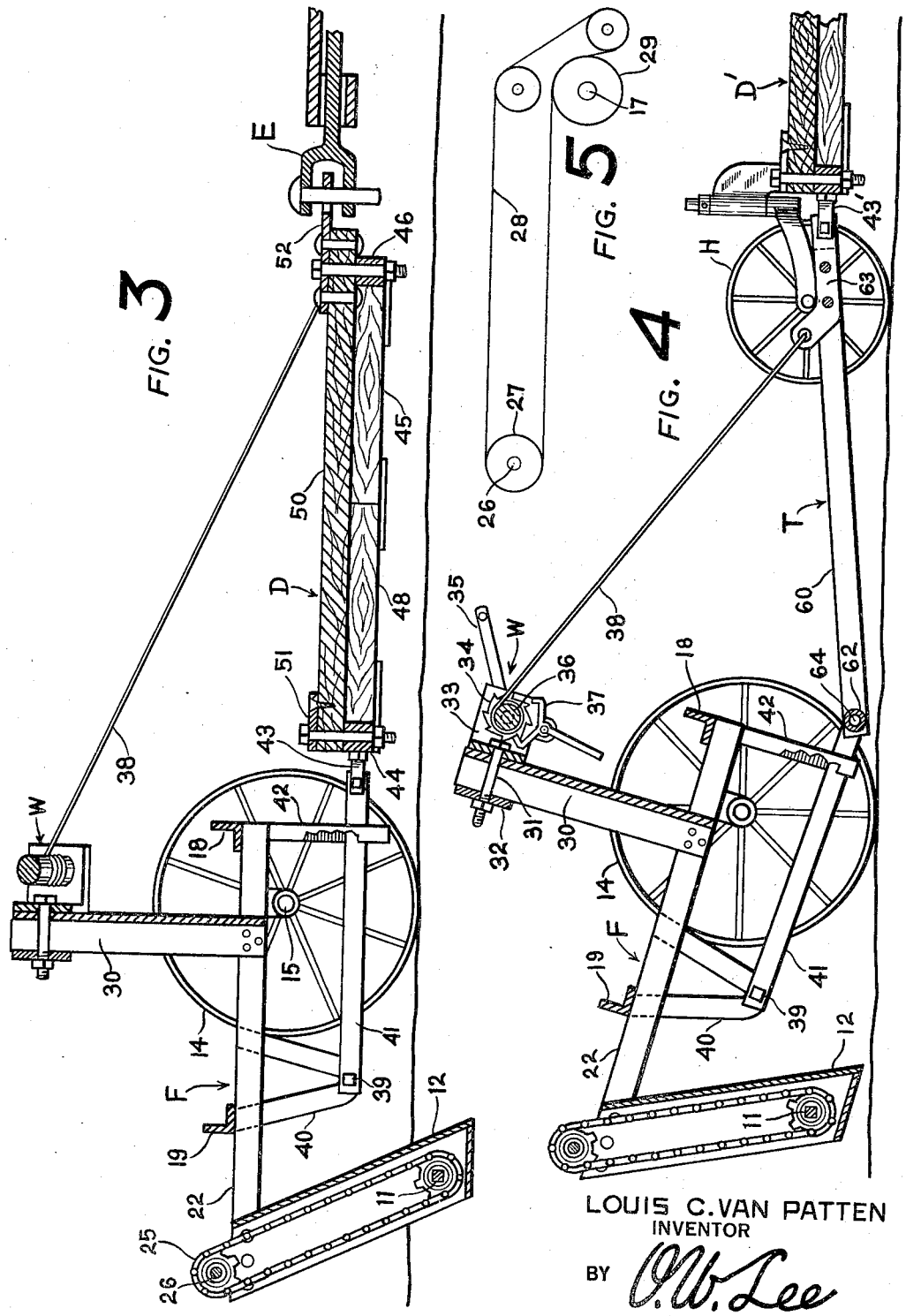

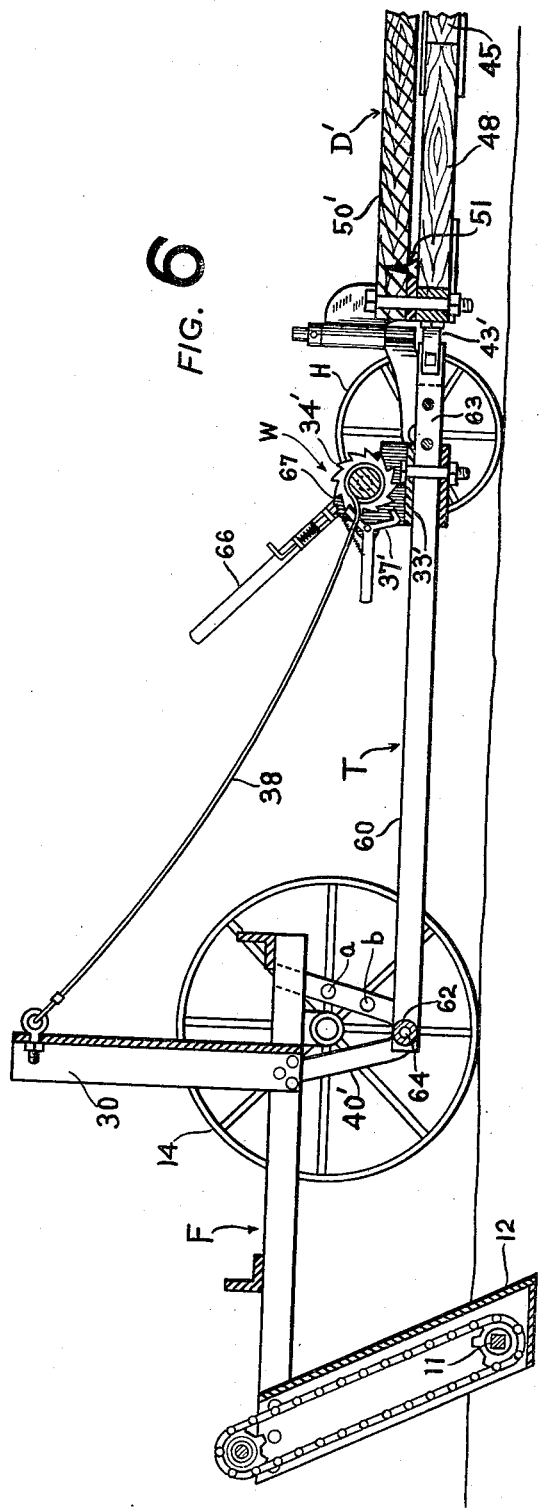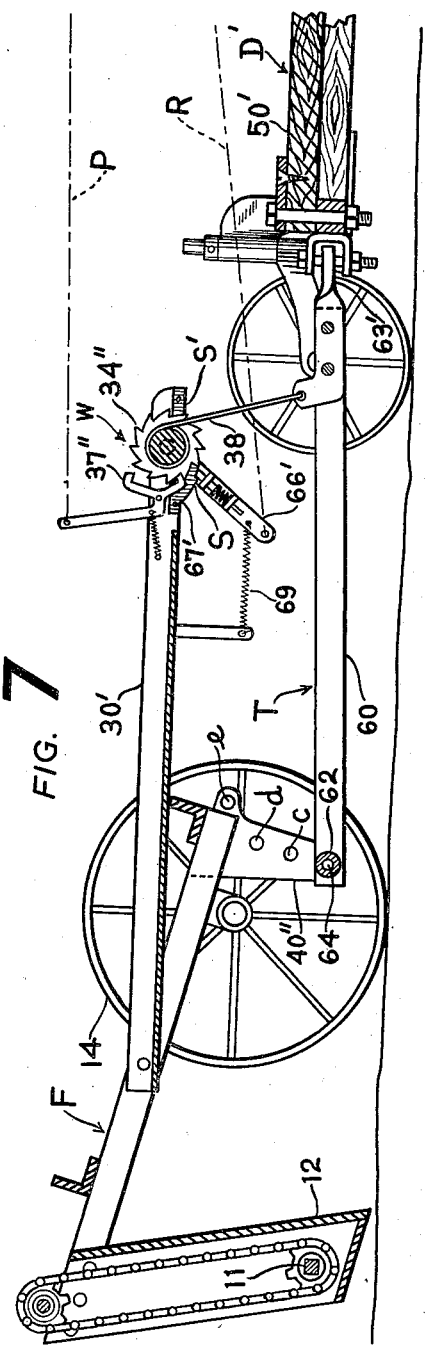

Patented July 4, 1939

2,165,019

UNITED STATES PATENT OFFICE 2,165,019

ROD WEEDER

Louis C. Van Patten, Cheney, Wash., assignor to Cheney Weeder Company, Cheney, Wash., a corporation of Washington Application December 20, 1938, Serial No. 246,822

15 Claims. (Cl. 97—42)

The present invention relates to certain new and useful improvements in rod weeders and is particularly directed to the improved means for lifting the weeding rod so as to eliminate the necessity for the commonly used transport wheels which are usually employed to limit the depth of penetration of the weeding rod and also to raise the same to the non-operative position.

Rod weeders were originally intended for the purpose of uprooting small weeds which spring up in summer fallowed ground, but practice and experience has extended their utilization to the broader purpose of general tillage, and they are now required to operate in fields overgrown with large tares. Transport wheels cause these large tares to accumulate under the machine, where they interfere with proper operation until removed.

Where wheat is grown on large acreages it is the general practice to cut the heads only and leave the full length stubble standing from one season to the next. This full length stubble, together with the weeds and other tares which spring up, make a rather bulky trash which does not readily clear the usual transport wheels, but drags along until this accumulation of refuse interferes with proper operation of the machine.

The present invention eliminates the need of the usual transport wheels, and raises the weeding rod by means of a lifting mast attached to the frame of the machine and connected to the draft frame by a cable which is wound by a winch.

The invention can be embodied in a plurality of weeders hitched in a gang to operate as a unit, as is essentially necessary for practical utilization of machines of this kind when used on large acreages.

The invention is so constructed that a plurality of weeders can be hitched in a gang and each machine can independently tilt according to the inclination of the ground when operated on hillsides, as is often the case in the Northwestern States where wheat is grown extensively.

The accompanying drawings illustrate practical embodiments of the invention.

Fig. 2 is a plan view of the invention embodied in three weeders hitched to a similar draft frame.

Fig. 3 is a vertical section taken on the line X—Z of Fig. 1.

Fig. 4 is a similar vertical section of Fig. 2.

Fig. 5 is a diagram of that portion of the drive means which is broken away in Figures 3, 4, 6 and 7.

Fig. 6 is a vertical section showing a modification of Fig. 4.

Fig. 7 is a vertical section showing a modification of Fig. 4.

Figure 1:
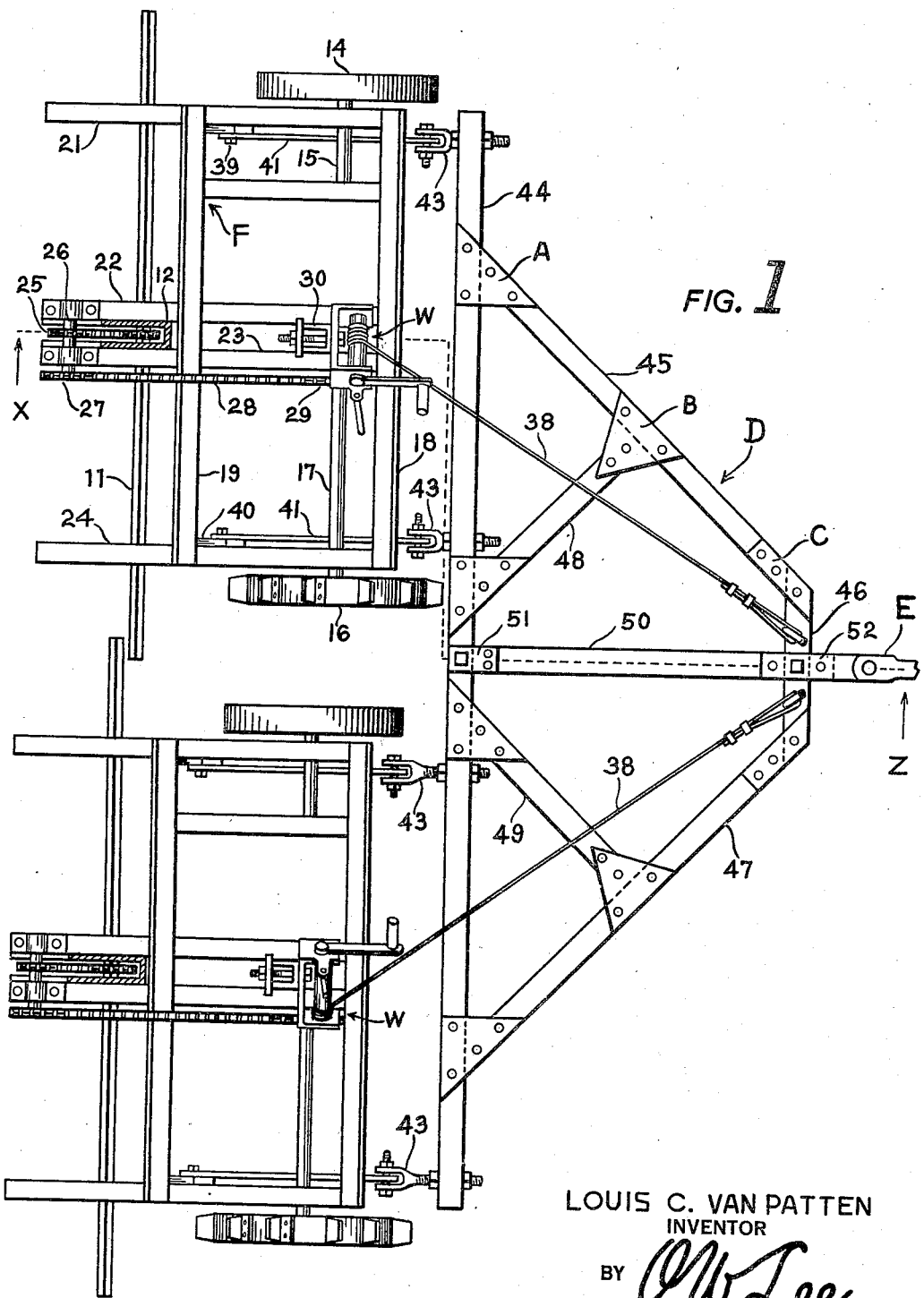
Fig. 1 is a plan view of the invention embodied in two weeders hitched to a single draft frame.

In the practical application of the invention, the weeder itself may be any of the well known forms that are in general use wherein the weeding rod 11 is carried by standards such as 12 or 10 else by the well known goose necks, which in each case are rigid with the rear portion of a suitable frame such as F rockably mounted upon carriage wheels such as 14 and 16 having axles 15 and 17. The weeding rod may be stationary, 15 but is preferably turned by one of the ground wheels, or else by other means.

For the purpose of illustration, the frame F is shown as consisting of a front rail 18, and back rail 19, connected together by rearwardly extending frame members 21, 22, 23 and 24 which carry suitable earth penetrating standards in which the weeding rod 11 is rotatably mounted. As here shown, the center standard 12 is rigidly secured between the frame members 22 and 23 and houses a part of the sprocket chain drive 25 which is turned by the sprocket wheel 27 on the shaft 26 and sprocket chain 28 from a sprocket wheel 29 on the axle 17 of the carriage wheel 16, the sprocket chain 28 being trained in an overshot manner as indicated in the diagram of Fig. 5, so as to produce reverse rotation of the weeding rod in accordance with the usual practice. This well known form of center drive may be replaced by the well known tumbler shaft end drive, or any other suitable form of drive may be employed. The frame members 21 and 24 may each carry a standard similar to 12 or else the well known goose necks may be employed instead.

As best seen in Fig. 4, a lifting mast 30 is secured to the frame F. As here shown, the lifting mast consists of a piece of channel iron disposed upright and bolted or riveted between the frame members 22 and 23. From the top of this lifting mast, a cable 38 extends forwardly for the purpose of lifting the rod 11 by rocking the machine upon the axles of the carriage wheels, by means of the winch W which may be variously situated as is illustrated in Figures 4, 6 and 7.

As shown in Fig. 4 the winch consists of a winding drum 36 rotatably mounted in a frame 33 and turned in any suitable manner, as for instance by the hand crank 35. A ratchet wheel 34 is rigid with the winding drum and the usual pawl may be provided, but an escapement pawl such as 37 is preferable for notch by notch release. As here shown, the base of the winch frame 33 is bored and a bolt 31 and clamp plate 32 are used to securely bind the winch frame to the lifting mast 30. This bolt and clamp plate construction provides for angling the axis of the winch as is essential in the embodiment shown in Fig. 1 where it will be seen that the winches on the two machines are set at different inclinations so as to assure proper wrap of the cables upon each respective winch, which would otherwise be impossible with converging cables as here illustrated. This preferred construction also provides for immediately converting the machines in Fig. 1 to the assembly shown in Fig. 2 and vice versa, the distinctions of which will now be explained.

The principal problem is to contrive an operative assembly for a plurality of machines. Fig. 1 shows a practical embodiment of two machines hitched to a single stiff draft frame. It is obvious that two machines hinged directly to a stiff draft frame, would not operate satisfactorily on irregular ground, for the reason that the machines could not tilt according to the inclination of the ground, and consequently one wheel and then another would be free of low ground. To overcome this impracticability, each of the two machines is connected to the stiff draft frame D by a pair of draft bars 41—41 which form a link connection between the machine and the draft frame and provide for each machine to independently tilt according to the inclination of the ground.

As shown in Fig. 1 and Fig. 3, these draft bars 41 are hinged at 39 to hangers 40 which extend downwardly from the weeder frame, and the draft bars are considerably lower than the axle line of the machine. This arrangement causes a part of the forward draft force to be converted into a downward thrust upon the weeding rod and materially adds to the penetrating effect of the weeding rod. Suitable means are provided at the front end of each draft bar to hold the same against lateral displacement, guide loops 42 being illustrated in the present instance, the draft bars having free up and down movement therein. The front end of each of these drafts bars is hinged to the draft frame D which may be of any suitable construction.

As shown in Fig. 1 and Fig. 3, the draft frame D preferably comprises a rear rail 44 connected to a short front rail 46 by converging side rails 45 and 47 and braced by struts 48 and 49, top and bottom tie plates such as A, B and C being employed to form a rigid assembly. A draft pole 50 has a face plate 51 and a pull plate 52 secured to the same surface thereof, and these two plates are of the same thickness so that the draft pole 50 can be bolted across the rear rail 44 and the front rail 46 with these plates in contact with those rails, or else with these plates on the side opposite those rails as is shown in Fig. 3. This construction provides for quickly and easily altering the position of the pull plate 52 with relation to the draft frame D so that the draft frame can be readily arranged level at different heights and connected to the tractor draw bar E which may be at various distances from the surface of the ground on different tractors, and also the draft frame D may be at different levels on different weeders, or on the same weeder for that matter. When the draft frame D is higher than the tractor draw bar E, the draft pole 50 can be bolted below the draft frame with the pull plate 52 either up or down according to requirements, in order to position the draft frame approximately level, which is desirable.

To the rear beam 44 of this draft frame, the draft bars 41 are hinged as indicated at 43, 43, 43 and 43 and being also hinged to the weeder at 39 they form link connections between the draft frame D and each weeder and provide for each weeder to tilt independently and accommodate itself to changing inclination of the surface of the ground. That is to say that each wheel of each weeder is free to rise and fall independently of each other and independently of the draft frame D, as is essential to successful operation on irregular ground.

As shown in Fig. 1 and Fig. 3 a cable 38 leads from each winch W to the forward part of the draft frame D and is suitably secured thereto. The winches are inclined at the proper angle to assure a regular wrap of the cable, and it will be seen that the cable can be wound upon the winch to raise each weeding rod 11 any required amount.

When three or more machines are hitched to the same draft frame, individual tongues T are provided for each weeder in the manner illustrated in Fig. 2 and each cable 38 leads from the forward portion of the tongue directly back to the respective winches which are positioned parallel with the frames of the machines. As here shown each tongue T consists of a pair of converging bars 60 and 61 spaced apart at their rear ends by a spreader bar 62 and having a pull bar 63 bolted between their front ends. The paired draft bars 41 of each machine are hinged to the respective tongues T as indicated at 64. The cable 38 is secured to the rear of the pull bar 63, and the front end of the latter is hinged at 43' to the rear rail 44' of the draft frame D' to provide for independent tilting movement of each machine as before explained.

The draft frame D' is essentially the same as hereinbefore described, and in this assembly each end of the rear rail 44' is supported by a wheel such as H. The draft frame D' is either made of sufficient weight or else it is loaded in any suitable manner, as for instance, sand bags are readily available without expense and are commonly used for such purposes.

Fig. 4 shows the result of winding the cable upon the winch and it will be observed that the tongue T drops, carrying the draft bars 41 to the bottom of the guides 42 and forming a break joint held against further movement. This action makes it possible to back the machines as is sometimes required and also makes it possible to hold the machines from inopportunely rolling forward when transported down grade. As shown in Fig. 2 the several weeders may be spaced apart by spreader links such as shown at K.

As thus far described the winch has been placed upon the lifting mast 30, however it may equally well be placed at the forward end of the cable in various modes. As shown in Fig. 6 the frame 33' of the winch is bolted on the front of the tongue T and the rear end of the cable is secured to the lifting mast 30. As here shown, the crank handle is supplanted by a ratchet lever 66 journaled on the spindle of the winch, and the adjacent end of the winch frame is formed into a cam plate 67 which raises the lever latch out of the path of the ratchet wheel 34' so as to provide for notch by notch release by the escapement pawl 37'. The lever latch spans this cam plate and the ratchet wheel, and is spring urged into a notch in the cam plate and held in non-operative position from which it is manually lifted for operation.

In Fig. 7 the lifting mast 30' extends forwardly of the weeder frame F and is shown as channel iron cut away on the front end and the winch mounted therein and provided with a ratchet lever 66' and escapement pawl 37'' each of which can be operated by pull ropes from a forward position if desired. A cam plate 67' is positioned adjacent the ratchet wheel 34'' and lifts the latch of the ratchet lever free of the path of the ratchet wheel where a suitable stop S is provided on the cam plate. This ratchet lever is spring urged to the rearward position, the spring 69 being shown for convenience of illustration, while in practice a suitable spring would be coiled around the spindle of the winch and connected to the ratchet lever. It will be readily understood that this lever can be operated from a forward position by a pull rope as indicated by the dotted line R, the forward end S' of the cam plate 67' limiting the stroke to reasonable range and the lever being spring urged back to the rear stop S with the lever latch free of the path of the ratchet wheel for operation of the escapement pawl by a pull rope indicated by the dotted line P. Such pull ropes can readily be alternately operated by the tractor driver, in a series of short jerks so as to alternately raise and lower the weeding rod as occasion requires. Similar pull rope operation can readily be provided with the winch in the position shown in either Fig. 4 or Fig. 6 and of course the ratchet lever can project upward when that position is more feasible.

The utilization of weeders varies widely from single machine operation, to several machines hitched in a gang in various modes, and the present invention can be readily adapted to a wide range of requirements.

The point of draft connections can also be varied, as is illustrated in Figures 3, 6 and 7. In Fig. 3 the point of draft connection at 39 is lower than and rearwardly of the axle line. In Fig. 6 the hanger bracket 40' is moved forward and the point of draft connection at 64 is lower than and directly below the axle line. In Fig. 7 the hanger bracket 40'' is at the front of the weeder frame and the point of draft connection at 64 is lower than and forwardly of the axle line. In Fig. 6 and Fig. 7 the draft bars 41 of Fig. 3 are not employed, and it will be seen that the tongue T forms link connections between the weeder and the draft frame; while in Fig. 4 the tongue T is used together with the draft bars 41. The point of draft connections can also be selectively positioned at various heights by employing the illustrated holes a, b, c, d and e shown in the hanger brackets of Fig. 6 and Fig. 7. The higher positions of draft connections give less down thrust on the weeding rod and can be used when occasion requires. The line of draft should be as nearly level as practical and for this purpose the wheels H can be of whatever diameter is best suited to the particular height of draft connection, and the draft pole 50' can be readily mounted either above or below the draft frame D', with the face plate 51 and pull plate 52 either up or down as required to position the draft frame reasonably level when the pull plate 52 is connected to the tractor draw bar E at whatever height the latter happens to be.

In Fig. 7 the front end of the pull bar 63' is shown twisted to horizontal position to receive a vertical bolt or the king pin of a tractor draw bar and this is preferable to the straight pull bars 63 of Fig. 2.

When the machines are operated on reasonably level ground, the winch and cable can be utilized to limit the depth of penetration of the weeding rod either for shallow weeding or for deeper tillage. When used on rugged ground too irregular to permit of reasonable regulation of depth of the weeding rod, the cable is slacked off in the manner illustrated in Fig. 6 and when occasion requires the weeding rod to be lifted, the winch is then operated for that purpose. As for instance, when bulky tares collect under the machine, the winch is turned to raise the weeding rod free of the ground, the tractor is then used to back the machine up sufficiently to partly dislodge the refuse which can then be more easily removed in the usual manner and the cable again slacked off to lower the weeding rod into the already tilled ground so that it can be moved forward at its former depth instead of requiring some distance of travel to reach that depth, as would be the case if the machine had not been backed up.

When rocky untillable ground is encountered, the winch is used to raise the weeding rod and carry it over such areas. Similarly, the winch can be employed to prevent the weeding rod from dropping into gulleys which are sometimes encountered in the path of travel. When it is desired to transport the machines from one place to another, the winch is used to raise the weeding rod well above the ground so as to afford travel over ground where operation of the machine is neither intended or desirable.

In the present disclosure, I claim as my invention:

1. In a gang of weeders, a draft frame, plurality of weeding machines, individual draft tongues rockably and tiltably connecting the respective weeding machines to said draft frame, each of said weeding machines having a frame rockably mounted on the axles of a pair of wheels and extending rearwardly therefrom with earth penetrating members rigid with the rear portion of the weeder frame and a weeding rod mounted on the lower ends of said earth penetrating members, each of said weeding machines having a lifting mast mounted on the frame thereof and having a cable connecting that mast with the draft tongue of that weeding machine and having a winch for winding such cable to shorten the span connecting that mast with that draft tongue.

2. A device as described in claim 1, wherein said draft tongues are hinged to the respective weeding machines at points lower than the axles of the wheels thereof.

3. A device as described in claim 1, wherein said draft tongues are hinged to the respective weeding machines at points lower than the axles of the wheels thereof and wherein each weeding rod is rotatably mounted and provided with a drive means operated by one of the wheels of that respective weeding machine.

4. In a gang of weeders, a draft frame, a plurality of weeding machines each having a frame rockably mounted on the axles of a pair of wheels and extending rearwardly therefrom with earth penetrating members rigid with the rear portion of the weeder frame and a weeding rod mounted on the lower ends of said earth penetrating members, draft bars rockably and tiltably connecting the respective weeders to said draft frame, said draft bars being hinged to the respective weeding machines at points lower than the axles of the wheels thereof, means for limiting the downward movement of said draft bars, a lifting mast mounted on the frame of each of said weeding machines, cables connecting the respective masts with the forward portion of said draft frame, and a winch for each respective cable for winding the same and shortening the span connecting the mast with said draft frame.

5. A device as described in claim 4, wherein each weeding rod is rotatably mounted and provided with a drive means operated by one of the wheels of that respective weeding machine.

6. An implement comprising a frame rockably mounted on the axles of a pair of wheels and extending rearwardly therefrom, earth penetrating members rigid with the rear portion of said frame, a weeding rod rotatably mounted on the lower ends of said earth penetrating members, means for rotating said weeding rod from one of said wheels, draft bars hinged to said implement at points rearwardly of and lower than said axles, means for limiting the downward hinge movement of said draft bars, a draft tongue hinged to said draft bars, a lifting mast mounted on said frame, a cable connecting said mast with the forward portion of said tongue, and a winch for winding said cable and shortening the span connecting said mast with said tongue.

7. An implement comprising a frame rockably mounted on the axles of a pair of wheels and extending rearwardly therefrom, earth penetrating members rigid with the rear portion of said frame, a weeding rod rotatably mounted on the lower ends of said earth penetrating members, means for rotating said weeding rod from one of said wheels, draft bars hinged to said implement at points lower than said axles, means for limiting the downward hinge movement of said draft bars, a draft tongue hinged to said draft bars, a lifting mast mounted on said frame, a cable connecting said mast with the forward portion of said tongue, and a winch for winding said cable and shortening the span connecting said mast with said tongue.

8. An implement comprising a frame rockably mounted on the axles of a pair of wheels and extending rearwardly therefrom, earth penetrating members rigid with the rear portion of said frame, a weeding rod rotatably mounted on the lower ends of said earth penetrating members, means for rotating said weeding rod from one of said wheels, a draft tongue hinged to said implement at points lower than said axles, a lifting mast mounted on said frame, a cable connecting said mast with the forward portion of said tongue, and a winch for winding said cable and shortening the span connecting said mast with said tongue.

9. An implement comprising a frame rockably mounted on the axles of a pair of wheels and extending rearwardly therefrom, earth penetrating members rigid with the rear portion of said frame, a weeding rod mounted on the lower ends of said earth penetrating members, draft bars hinged to said implement at points lower than said axles, means for limiting the downward hinge movement of said draft bars, a tongue hinged to said draft bars, a lifting mast mounted on said frame, a cable connecting said mast with the forward portion of said tongue, and a winch for winding said cable and shortening the span connecting said mast with said tongue.

10. An implement comprising a frame rockably mounted on the axles of a pair of wheels and extending rearwardly therefrom, earth penetrating members rigid with the rear portion of said frame, a weeding rod mounted on the lower ends of said earth penetrating members, a draft tongue hinged to said implement, a lifting mast mounted on said frame, a cable connecting said mast with the forward portion of said tongue, and a winch for winding said cable and shortening the span connecting said mast with said tongue.

11. In a rod weeder having a lifting mast with a cable and a winch for lifting the weeding rod and a ratchet wheel for turning said winch, a fixed cam plate adjacent said ratchet wheel, a latch lever cooperating with said cam plate and ratchet wheel, said cam plate having a notch for holding the latch of said lever clear of the path of said ratchet wheel, said cam plate having a cam face for lifting said latch into said notch, and an escapement pawl cooperating with said ratchet wheel.

12. In a rod weeder having a lifting mast with a cable and a winch for lifting the weeding rod and a ratchet wheel for turning said winch, a fixed cam plate adjacent said ratchet wheel, a latch lever cooperating with said cam plate and ratchet wheel, said cam plate having a cam face for lifting the latch of said lever clear of the path of said ratchet wheel, a spring urging said lever to inoperative position, stop means for limiting the stroke of said lever, and an escapement pawl cooperating with said ratchet wheel.

13. In a rod weeder having a lifting mast with a cable and a winch for lifting the weeding rod and a ratchet wheel for turning said winch, a fixed cam plate adjacent said ratchet wheel, a latch lever cooperating with said cam plate and ratchet wheel, said cam plate having a cam face for lifting the latch of said lever clear of the path of said ratchet wheel, a spring urging said lever to inoperative position, stop means for limiting the stroke of said lever in each direction, a spring urged escapement pawl cooperating with said ratchet wheel, said lever and said escapement pawl arranged so as to be operated by pull ropes leading in the same direction.

14. In a rod weeder having a lifting mast with a cable and a winch for lifting the weeding rod, said winch journaled in an individual frame, means for mounting said frame upon said mast in such manner that the axis of the winch can be held at any required inclination.

15. In a gang of weeders, a draft frame comprising a rear rail and a front rail connected together by side rails, a draft pole, a face plate and a pull plate of equal thickness secured to the same face of said draft pole, means for securing said draft pole across said rear rail and said front rail with said pull plate alternately at four different heights relative to said draft frame, and means for hitching a number of weeders to said rear rail.

LOUIS C. VAN PATTEN.